United States Patent

[11] 3,612,742

[72] Inventors Donald P. Snowden
San Diego;
George P. Gamble, La Jolla, both of Calif.
[21] Appl. No. 800,571
[22] Filed Feb. 19, 1969
[45] Patented Oct. 12, 1971
[73] Assignee Gulf Oil Corporation

[54] ALTERNATING CURRENT SUPERCONDUCTIVE TRANSMISSION SYSTEM
10 Claims, 5 Drawing Figs.

[52] U.S. Cl. .................................................. 174/15,
174/105, 174/106, 174/126, 335/216
[51] Int. Cl. ........................................................ H01b 7/34
[50] Field of Search ............................................. 174/DIG. 6,
DIG. 7, 126, 105, 106; 335/216; 333/99 S

[56] References Cited
UNITED STATES PATENTS
3,238,025  3/1966  Pendleton et al. ............  174/126 UX
3,263,193  7/1966  Allen et al. ....................  174/102 X
3,331,041  7/1967  Bogner ..........................  335/216

FOREIGN PATENTS
1,511,600  12/1967  France ..........................  174/DIG. 7
3,819,229  9/1963  Japan ............................  174/DIG. 6

OTHER REFERENCES
Garwin, R. L. & Matisoo, J. Superconducting Lines For The Transmission Of Large Amounts Of Electrical Power Over Great Distances, Proceedings of the IEEE Vol. 55, No. 4, April 1967 pp. 538– 548 copy in 174-S.C.

Primary Examiner—Lewis H. Myers
Assistant Examiner—A. T. Grimley
Attorney—Anderson, Luedeka, Fitch, Even and Tabin ABSTRACT: An alternating current superconductive transmission cable and system are provided in which two superconductive conductors are positioned coaxially and separated by insulation. Normally conductive layers are placed within the inner conductor and around the outer conductor to dissipate heat transients. For transmitting large currents the superconductive conductors are formed of a composite material of coaxial alternating layers wherein layers of superconductive material are positioned between layers of nonsuperconductive material.

PATENTED OCT 12 1971

INVENTORS
DONALD P. SNOWDEN
GEORGE P. GAMBLE

Anderson, Luedeka, Fitch, Even & Tabin
ATTYS.

INVENTORS
DONALD P. SNOWDEN
GEORGE P. GAMBLE

*Anderson, Luedeka, Fitch, Even & Tabin*
ATTYS.

ALTERNATING CURRENT SUPERCONDUCTIVE TRANSMISSION SYSTEM

This invention relates generally to electrical transmission and, more particularly, to an alternating current transmission system utilizing superconductivity.

Electrical transmission utilizing superconductivity has received increasing attention in recent years for purposes of both power distribution and data transmission. In the area of data transmission, the minimization of attenuation resulting from the complete absence of resistance in superconductors may provide an advantage over conventional transmission lines. Power transmission using superconductive elements, at least in theory, has two distinct advantages over conventional methods: the lack of ohmic losses resulting from the absence of resistance which would facilitate transmission for long distances and the high-current carrying capacity of superconductive materials which would facilitate transmitting large amounts of power.

The transmission of large amounts of electrical power over long distances has become a subject of increasing interest due to the advantages of power pooling in which separate power systems having different load distributions are linked so that each system requires less reserve generating capacity. The increasing desirability of locating generating plants, both of the nuclear type and the fossil fuel type, at points remote from load centers also contributes to the need for improvements in transmission techniques. Power transmission methods which are sufficiently economical may even make it cheaper to generate power at the fuel source and to transmit the power to the load center rather than to transport the fuel to the load center before converting it to electrical energy. Sources of electrical energy now considered too remote to use may become accessible with improved transmission capabilities.

At present most power transmission takes place over head power lines and only a relatively small amount utilizes underground or surface level lines. Although such underground or surface lines are generally more expensive than overhead lines, the former are coming into greater use for aesthetic reasons and due to considerations of safety and reliability. As ground lines have found greater application, the possibility of utilizing the phenomenon of superconductivity in power transmission has received greater attention, since it is only with underground or surface installations that the refrigeration of the entire power line necessary for superconductivity becomes practical.

Even so, practical superconductive transmission lines have presented great problems In power transmission an important obstacle has been the great mass of the insulated conductor or cable portion of the transmission line even when superconductive elements are utilized. This mass may be as much as 10 tons per kilometer, thus requiring the cable to consist of relatively short sections electrically joined at frequent intervals. Making electrical joints of superconductive materials is difficult, and the use of normal materials, of course, tends to offset the advantages of using superconductive materials. Other difficulties include the problems of refrigerating the entire line below the superconductor's critical temperature and the maintenance of the adjacent magnetic field below the critical magnetic field. Failure on either score will result in the superconductive element being "quenched", i.e., losing its superconductive properties. A further problem is that localized energy transients in a superconductor operating near its critical limits may cause a small region to assume the normally conductive state, resulting in high heat dissipation in the region which in turn causes the region of normal conductivity to increase and ultimately the entire superconductor to fail.

Proposals for electrical transmission utilizing superconductivity have generally focused upon direct current transmission lines rather than upon alternating current. This has been so despite the fact that both power sources and loads are usually adapted for alternating current and costly conversion equipment is required at each end of a direct current power transmission line. Alternating current is also clearly more useful for data transmission. However, the capacitative charging current resulting from the voltage difference between opposing alternating current conductors may become excessive. Further, alternating current results in heating effects which make maintenance of the low temperatures required for superconductivity difficult. Such heating effects may stem from a variety of causes such as the fact that the conductors are not perfectly elastic yet are subjected to rapidly fluctuating pressure exerted by the varying magnetic field caused by the alternating current. Another cause of heating, particularly for type II superconductors, is the phenomenon of flux migration, movement of flux lines which produces losses. This phenomenon becomes particularly significant when it is recalled that type II superconductors are of much greater potential usefulness than type I superconductors because they can maintain their superconductivity at much higher magnetic fields than do type I superconductors.

Accordingly, it is an important object of the present invention to provide an alternating current transmission system utilizing superconductive elements.

Another object of the invention is to provide an alternating current superconductive transmission cable in which the effects of flux migration and heating are minimized.

Still another object of the invention is to provide an alternating current superconductive power transmission system which can extend for great distances.

A further object of the invention is to provide an alternating current superconductive power transmission cable which minimizes the problems of capacitative charging currents.

Other objects and advantages of the invention will become apparent from the following description taken in connection with the accompanying drawings, in which.

It will be understood that the present invention relates to an alternating current superconductive transmission system and to a transmission cable therefor. However, many of its advantages can best be appreciated in the environment of specific transmission line housings and refrigeration systems which provide the low temperatures required to utilize superconductive elements. Hence, the description will begin with a brief exposition of one such environment. No unnecessary limitation is to be implied from this description, however.

Figure 1:
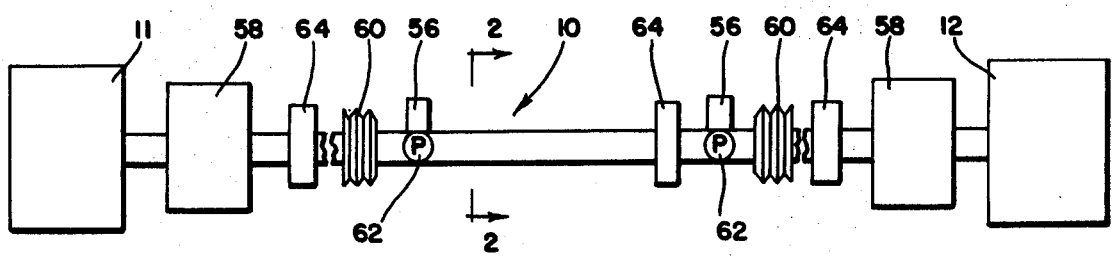
FIG. 1 is a side view in diagrammatic form of an alternating current superconductive transmission line.
Figure 2:
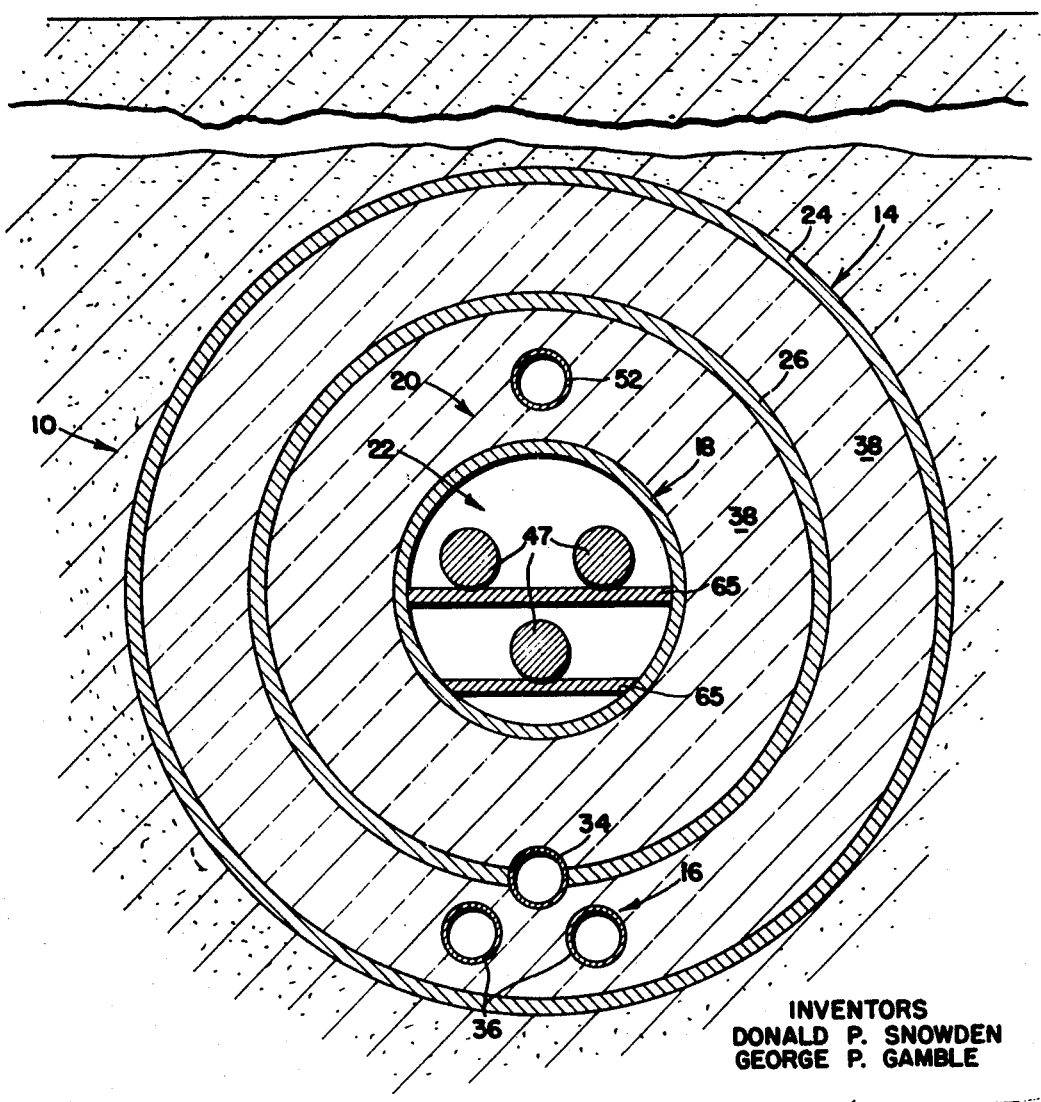
FIG. 2 is a cross-sectional view of the transmission line of FIG. 1 taken along line 2—2.

As shown in FIGS. 1 and 2 an alternating current superconductive transmission line 10 extends between a power source 11, which may be an electrical power-generating station, and a load 12, which may be a stepdown transformer station or any other facility which utilizes electrical power. As illustrated in cross section in FIG. 2 the transmission line includes an outer casing 14 extending along the length of the line within which are disposed elements of a first level or medium low temperature refrigeration system 16 and an inner casing 18 preferably concentric with the outer casing. Associated with the inner casing are a second level or lowest temperature refrigeration system 20 and an electrical transmission system 22.

More specifically, the outer casing 14 comprises a vacuumtight pipe or conduit 24, which may be steel, is circular in cross section and may be located above or below grade as desired, although as illustrated its top is shown an indeterminate distance below the grade level. The casing 14 has a central metal lining 26 or heat shield circular in cross section and concentric or coaxial with the conduit 24 which may be of aluminum, tin plated steel or the like, and which serves as a shield to radiant heat. The joints of the metal liner 26 need not be made vacuum tight although the conduit 24 is vacuumtight.

Within the conduit 24 are elements of the first level or medium low-temperature refrigeration system 16, which utilizes nitrogen as a refrigerant. The nitrogen is circulated in liquid form in one direction along the line 10 through a liquid nitrogen conduit 34 and returns in the opposite direction in gaseous form under high pressure, e.g., about 10 atmospheres, through a gaseous nitrogen conduit or conduits 36. The nitrogen conduits are supported within the conduit by heat-insulating supports (not shown) and the liquid nitrogen pipe 34 is arranged in thermal contact with the metal liner 26 so as to cool the metal liner. The nitrogen refrigeration system may be designed with parameters which permit the heat shield 26 to be maintained at about 77° K.

Above the nitrogen conduit as illustrated and supported by heat-insulating supports (not shown) is positioned the elongated inner casing or conduit 18 which is coaxial with the outer casing 14. This inner casing is in the form of a pipe capable of containing helium under pressure. The space between the outer conduit 24 and the heat shield 26 as well as that between the heat shield 26 and the inner conduit 18 may be filled, as illustrated, with evacuated super insulation 38 or may simply be a vacuum.

As illustrated, within the heat shield 26 are positioned elements of the lowest temperature cooling system 20 and the transmission system 22 comprising at least one cable 47 and as illustrated a plurality of such cables. The coolant may be liquid helium or gaseous helium under high pressure. Between the heat shield 26 and the conduit 18 is a return helium conduit 52 for returning the helium to its source after it has cooled the cable. Within the conduit 18 are positioned the transmission system cables 47 and a quantity of helium coolant which fills the conduit 18. The coolant maintains the cable at a temperature sufficiently low that the superconductive elements in the cable will be in a superconductive state. Although a temperature of no more than about 5° K is appropriate, where the superconductive elements in the cable comprise $Nb_3Sn$, 12° K to 14° K might be usable. The search for superconductors with higher critical temperatures is a continuing one and even higher temperatures may be suitable for as yet undiscovered superconductive materials.

As illustrated in FIG. 1, the transmission line 10 also includes vacuum pumps 56 at appropriate intervals for evacuating the space between the conduit 24 and the conduit 18. Also suitably spaced intervals along the line are positioned refrigeration stations 58 which supply the liquid nitrogen and liquid or gaseous helium to their respective conduits and to which the gaseous nitrogen and the spent helium coolant are returned.

As also illustrated diagrammatically in FIG. 1, the line may be provided with suitably spaced bellows devices 60 to provide for expansion and contraction of the line length during the cooling down and heating up of the line before and after operation, or other methods may be employed. Additional circulating pumps 62 for the helium and nitrogen refrigerants may also be provided between the refrigerating stations. Further liquid-vapor separators 64 may be provided between refrigerating stations to meet problems raised by the gradual vaporization of the refrigerants as they move along the liquid phase conduits away from the refrigerating stations by removing vapor from the outgoing conduit and shunting it to the return conduit. All of these devices, however, are conventional and might even be dispensed with in some applications where the problems they solve do not arise. All such auxiliary devices may receive electrical power from an auxiliary cable.

Figure 3:
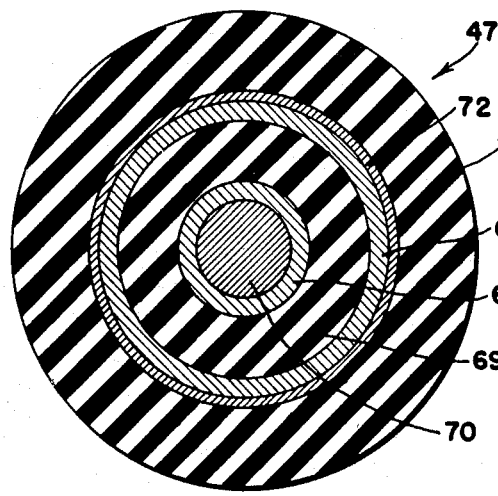
FIG. 3 is a cross section of a cable element for an alternating current superconductive transmission system.

As previously mentioned the transmission system 22 comprises at least one cable 47 positioned within the conduit 18. The cables 47 may be positioned on the bottom of the conduit but as illustrated are on shelves 65 within the conduit 18. A cross section of one such cable 47 is shown in FIG. 3. Generally the illustrated cable 47 comprises two longitudinally extending conductors 66 and 68 each formed of a superconductive material. One of the conductors 66 is positioned within the other conductor 68 which is tubular, and the outer and inner conductors are supported in fixed relationship to one another by electrical insulation 69. The conductors 66 and 68 are connected to one another through the alternating current power source 11 and the load 12 so that the currents in the conductors are opposite to one another at all times. The illustrated conductors 66 and 68 are circular in cross section and coaxial with one another so that magnetic fields outside of the outer conductor which might affect other cables are prevented and so that the fields between the two conductors are parallel to the surfaces thereof. The same current is, of course, carried by each conductor, so that if material capable of carrying the same current density is used for both, the cross-sectional areas are equal to one another. If materials of differing capability were used the cross-sectional areas could differ.

In order to maintain the conductors 66 and 68 in the superconductive state despite energy transients both conductors are in electrical and thermal contact along substantially their entire lengths with layers 70 and 72 of material which has high normal-state conductive properties and also has high-thermal conductivity. Copper, aluminum or certain alloys are suitable materials for these layers with aluminum being preferred in many applications due to its lightweight. As illustrated, the inner conductor 66 is annular and one of the layers 70 is within the conductor 66 while the other layer 72 is outside of the outer conductor 68. By this means neither layer is affected by the alternating current fields between the two conductors and no eddy current losses in such layers occur. The inner layer 70 also provides mechanical support for the inner conductor and the remainder of the cable.

The most important function of the layers 70 and 72 is to prevent the quenching of the superconductive conductors 66 and 68 if a small region of one goes into the normal state. This result is achieved because the respective layers 70 and 72 provide low-resistance electrical and thermal paths adjacent the superconductive materials. Heat generated in a region of superconductive material which switches into its normal state is dissipated in a highly thermally conductive layer 70 or 72. Thus, the normal region does not grow but instead cools below its critical temperature and becomes superconducting again. The layers also provide parallel electrical paths in the event the conductors 66 and 68 go normal.

The outer layer 72, as illustrated, is enveloped in a layer of electrical insulation 74 which if used must have good heat-conducting properties to aid in refrigerating the superconductor. The thermal expansion qualities of the insulation should be matched with the remaining materials of the cable and, therefore, materials such as a plastic, vinyl or resin filled with a suitable filler such as alumina are preferred. Organic insulators such as polyethylene may be used but are less desirable due to the mismatch of thermal expansion properties.

In the embodiment shown in FIG. 3 the layer 70 comprises a solid wire. However, as shown in FIG. 4, it would be possible to utilize an annular tube for the layer 70 thus providing a central channel 76 for the flow of coolant.

Figure 4:
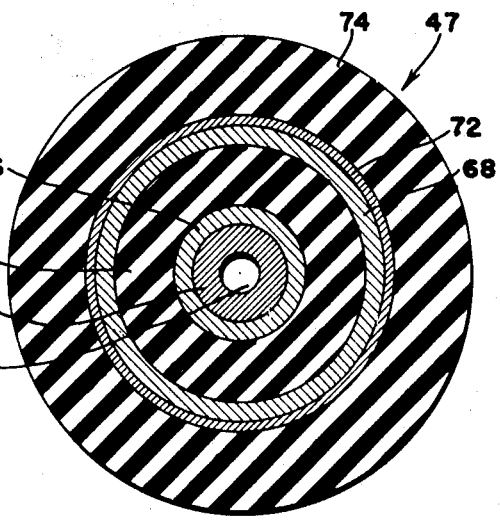
FIG. 4 is a cross section of another form of cable element for an alternating current superconductive transmission system.
Figure 5:
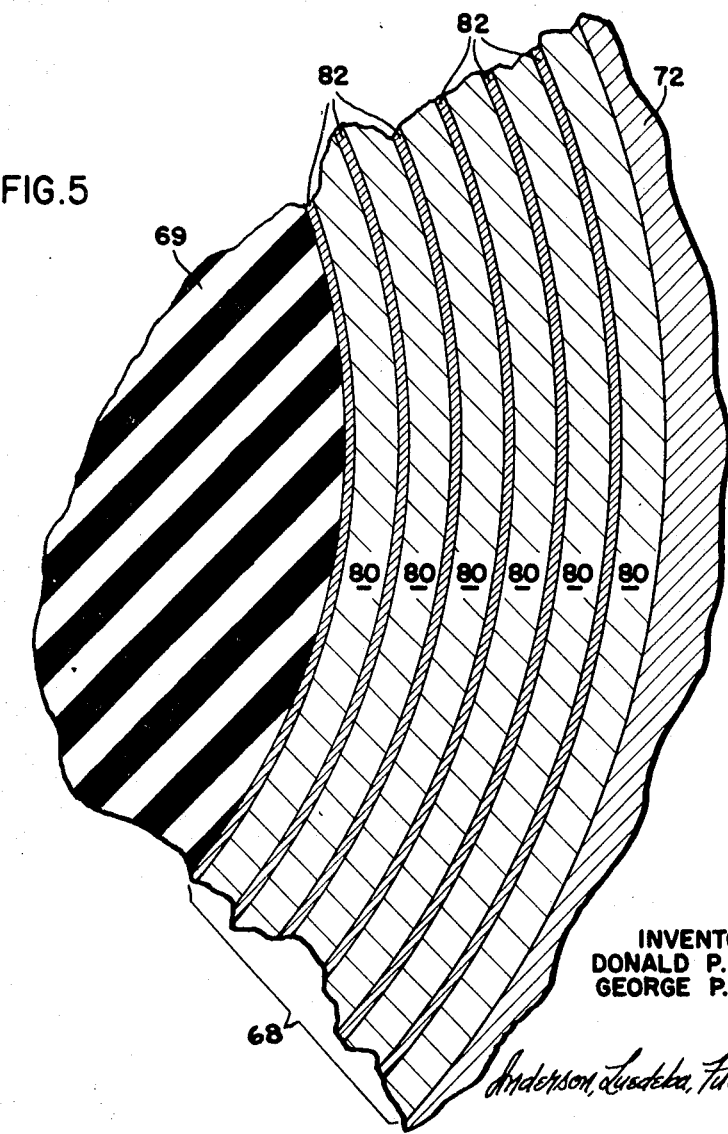
FIG. 5 is an enlarged fragmentary cross-sectional view of the cable element shown in FIG. 3.

In either the embodiment of FIG. 3 or that of FIG. 4 superconductive conductors 66 and 68 are, as shown in FIG. 5, preferably a composite material of alternating layer construction, with the layers being coaxial with the conductors 66 and 68 taken as a whole. Generally the conductors 66 and 68 include a plurality of discrete thin layers 80, usually less than 1,000 A thick, of a superconductive material and a plurality of discrete thin layers 82 of a second material which is a nonsuperconductor. That is, it may be a material of normal conductive or insulative properties disposed intermediate the layers 80 of superconductive material.

More particularly, the layers 80 are preferably formed of a type II superconductor, such as $Nb_3Sn$ or $V_3Si$, which has a temperature of transition to the superconductive state which is in about 17° K. The thin layers 82 may be formed of any suitable material which is a normal conductor at the contemplated temperature of operation such as silver, copper, etc. or an insulator such as composites of silicon or aluminum or suitable organic compounds. An important requisite of the material which makes up the thin layers 82 is that its expansion and contraction characteristics be compatible with that of the material of the layers 80.

It would seem upon superficial examination that disposing layers of material which are nonsuperconductive within a superconductive material could only result in a lower overall average current density because the resistivity even of merely normally conductive layers, to say nothing of insulative layers, is so much greater than that of the superconductive layers. However, the unexpected contrary result is the case.

The reasons for this phenomena are not completely understood and the following tentative explanation is not intended to limit the scope of the claims appended hereto. The "lower critical field" $H_{cl}$ of a type II superconductor is the value of the magnetic field below which there is a Meissner effect, i.e., the magnetic induction inside the superconductor is zero except in a thin surface layer thereof. By way of example for $Nb_3Sn$ the $H_{cl}$ is about 200 Oersteds and for Nb, the $H_{cl}$ is about 1,400 Oersteds. It is believed that when the lower critical field is exceeded small cylindrical regions of the superconductor become normally conductive, each being surrounded by a circulating current or vortex producing a flux in the region, which has been referred to as a "fluxoid". The radius of a fluxoid is in the neighborhood of the flux penetration depth of the superconductor, i.e., the depth to which an external magnetic field penetrates the material. An important source of alternating current losses in a type II superconductor is the motion of magnetic flux through the material driven by the transport current. The motion of the flux lines or fluxoids causes losses which may be described in two alternative ways. It may be said that the motion of the flux generates a voltage in the conductor which creates a power loss or it may be said that the interaction of the moving fluxoid with the conductor creates a force opposing its movement which results in energy losses when the fluxoid is found to move. It has been suggested that defects or discontinuities in the structure of a superconductive material tend to hinder motion of flux and pin down flux lines. It is also believed that in the case of sufficiently thin superconductive layers, i.e., those less than the penetration depth $\lambda$, fluxoids cannot form, even if the lower critical field is exceeded.

Thus, it appears that the thickness of the layers 80 should be less than that at which fluxoids can form, i.e., the penetration depth of the superconductive material forming the layers 80. For $Nb_3Sn$ the penetration depth is about 2,900 A, and for pure Nb it is about 500 A. The minimum thickness of the layers 80 appears to be limited only by the practical problems of forming a uniform and integral or continuous layer so that no gaps exist. Using vacuum deposition techniques, suitable layers 80 as thin as 400 A or less may be formed and so utilized.

The nonsuperconductive layers 82 need only be thick enough to perform the function of providing an integral barrier thus dividing the superconducting material into layers 80 thin enough to prevent fluxoid formation and typically may be between 15 A and 400 A or about 20 percent of the superconductive layers. In this respect the thickness may vary somewhat with the properties of the specific material used. Clearly the use of additional amounts of nonsuperconductive material in each layer beyond that which is necessary to perform the desired function will only decrease the overall maximum current density. Preferably the layers 82 are substantially thinner than the layers 80. The nature of the barrier layers 82 which are most desirable for a given application depends upon a variety of factors. On the one hand, normally conductive metallic layers would provide an additional means of shunting energy from a region of a superconductive layer 80 which went to its normal state, in a manner similar to that performed by the thick normally conductive layers 70 and 72. Additionally, a mechanical break in one superconductive layer could easily be bypassed and all layers could be more easily connected at the end of the line or at splices. On the other hand, eddy current losses may occur in the normal metal. In addition superconductivity may be induced in the normal metal due to the proximity effect. If this occurs the advantage of prevention of fluxoids may be lessened and hence, in some circumstances, insulative materials for the layers 82 may be preferred.

It should be noted that the coaxial geometry of the conductors alone provides distinct advantages over identical flat ribbon or wire conductors parallel to and spaced from one another as are most normal conductors in alternating current transmission lines, even if the composite layered material is not used for the conductors. If, for example, the total required current could be carried in an inner conductor 66 which was no thicker than the penetration depth of the material (and hence in an even thinner outer conductor) layer would not be required. Such an arrangement might be especially useful if a material such as niobium were used since it has a relatively high-lower critical field. On the other hand, niobium has a relatively low critical temperature (9.4° K) so that refrigeration requirements might be greater than with such materials as $Nb_3Sn$. Indeed, niobium could serve as a nonsuperconductive layer 82 between superconductive layers 80 of $Nb_3Sn$ if the operating design temperature of the cable were between the critical temperatures of the two materials.

Due to the closed configuration of the coaxial conductors, edge effects and associated losses are eliminated since the conductors have no edges. Further, the magnetic field generated by the currents is everywhere and at all times parallel to the surfaces of the conductors, and no field exists outside of the outside conductor to cause eddy currents in the surrounding material or adjacent cables. Hence, the high currents possible with superconductors may be more effectively utilized. The inner and outer conductors are mechanically stable, and no net forces due to the transport current exist. Furthermore, if desired, the dimensions, current and voltage of such a cable may be chosen to be matched to the load so that the inductive or capacitive compensation frequently used on normal transmission lines is not required.

An example of a cable in accordance with the invention capable of carrying 34.4 megawatts and being matched to the load is as follows:

Current density in superconductors = $5 \times 10^6$ amps per square cm.
Thickness of superconductive layers (80) = 1.4 microns.
Outer radius of inner conductor = 0.61 cm.
Inner radius of outer conductor = 0.94 cm.
Voltage = 24,300 volts (r.m.s.).
current = 1414 amps (r.m.s.).
Dielectric Constant of intermediate insulation (69) = 2.3.

Thus, it may be seen that a greatly improved alternating current superconductive transmission system has been provided, suitable for either power or data transmission, which overcomes many of the problems of the prior art, such as heating effects and flux migration. The system may be utilized in a variety of types of alternating current transmission lines. A three-phase transmission line, for example, would utilize a separate cable or set of cables for each phase all of which would fall within the spirit and scope of the invention, various features of which are set forth in the accompanying claims.

We claim:

1. A transmission cable comprising a pair of longitudinally extending conductors for connection between an alternating current power source and a load, each of said conductors being formed of a superconductive material, said conductors comprising an inner conductor and an outer tubular conductor surrounding said inner conductor, and electrical insulation positioned between and supporting said inner and outer conductors in fixed relationship with one another wherein each of said conductors have annular cross sections, said cable including a pair of longitudinally extending conductive layers of material having high-thermal conductivity and high normal-state electrical conductivity, said conductive layers comprising an inner conductive layer inside said inner conductor and in electrical and thermal contact therewith along substantially its entire length, and an outer conductive layer outside said outer conductor and in electrical and thermal contact therewith along substantially its entire length.

2. A transmission cable in accordance with claim 1 wherein said inner conductive layer comprises a solid conductor.

3. A transmission cable in accordance with claim 1 wherein said inner conductive layer comprises a hollow tube for conducting a coolant.

4. A transmission cable in accordance with claim 1 wherein said each of said conductors comprises a plurality of coaxial layers of a first material which has superconductive properties at a low-absolute temperature alternating with at least one layer of a second material which has nonsuperconductive properties at said low-absolute temperature to provide a superconductive conductor of alternating layer construction.

5. A transmission cable in accordance with claim 4 wherein said second material is an electrical insulator.

6. A transmission cable comprising a pair of longitudinally extending conductors for connection between an alternating current power source and a load, each of said conductors being formed of a superconductive material, said conductors comprising an inner conductor and an outer tubular conductor surrounding said inner conductor, and electrical insulation positioned between and supporting said inner and outer conductors in fixed relationship with one another, wherein said each of said conductors comprises a plurality of coaxial layers of a first material which has superconductive properties at a low-absolute temperature alternating with at least one layer of a second material which has nonsuperconductive properties at said low-absolute temperature to provide a superconductive conductor of alternating layer construction and wherein said second material has normal state conductivity.

7. A transmission cable comprising a pair of longitudinally extending conductors for connection between an alternating current power source and a load, each of said conductors being formed of a superconductive material, said conductors comprising an inner conductor and an outer tubular conductor surrounding said inner conductor, and electrical insulation positioned between and supporting said conductors in fixed relationship with one another, wherein said each of said conductors comprises a plurality of coaxial layers of a first material which has superconductive properties at a low-absolute temperature alternating with at least one layer of a second material which has nonsuperconductive properties at said low-absolute temperature to provide a superconductive conductor of alternating layer construction and wherein said layers of said first material are between about 400 A and about 1,000 A in thickness.

8. A transmission cable comprising a pair of longitudinally extending conductors for connection between an alternating current power source and a load, each of said conductors being formed of a superconductive material, said conductors comprising an inner conductor and an outer tubular conductor surrounding said inner conductor, and electrical insulation positioned between and supporting said inner and outer conductors in fixed relationship with one another, wherein each of said conductors comprises a plurality of coaxial layers of a first material which has superconductive properties at a low-absolute temperature alternating with at least one layer of a second material which has nonsuperconductive properties at said low-absolute temperature to provide a superconductive conductor of alternating layer construction and wherein said layers of said first material are at least of such thickness as to be continuous and substantially uniform.

9. An alternating current transmission system comprising a pair of longitudinally extending conductors connected to one another through an alternating current power source and a load, so that the currents in said conductors are opposite to one another, each of said conductors being formed of a superconductive material, said conductors comprising an inner conductor and an outer tubular conductor surrounding said inner conductor, electrical insulation between and supporting said inner and outer conductors in fixed relationship with one another, and means for maintaining said superconductive material in its superconductive state.

10. An alternating current transmission system comprising a pair of longitudinally extending conductors for connection between an alternating current power source and a load, each of said conductors being formed of a superconductive material, said conductors comprising an inner conductor and an outer tubular conductor surrounding said inner conductor, electrical insulation between and supporting said inner and outer conductors in fixed relationship with one another, and means for maintaining said superconductive material in its superconductive state wherein said means for maintaining said superconductive material in its superconductive state comprises a tubular casing surrounding said conductors for containing a lowest temperature coolant, a tubular heat shield surrounding and coaxial with said casing and thermally connected to a medium low-temperature coolant, and a tubular conduit surrounding and coaxial with said casing, said heat shield and said conduit being thermally insulated from one another.